Figure 1:
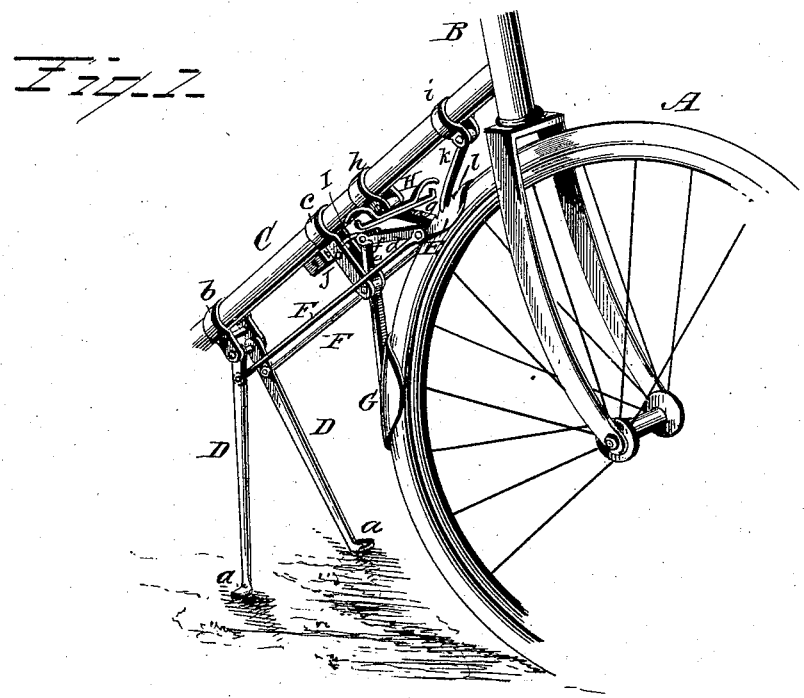

(No Model.)

C. A. WADE.
BICYCLE SUPPORT.

No. 585,140. Patented June 22, 1897.

WITNESSES
O. J. Williamson
W. J. Browning

INVENTOR
Charles A. Wade.
per Chas. H. Fowler
Attorney

UNITED STATES PATENT OFFICE.

CHARLES A. WADE, OF PARKERSBURG, WEST VIRGINIA.

BICYCLE-SUPPORT.

SPECIFICATION forming part of Letters Patent No. 585,140, dated June 22, 1897.

Application filed March 28, 1896. Serial No. 585,145. (No model.)

*To all whom it may concern:*

Be it known that I, CHARLES A. WADE, a citizen of the United States, residing at Parkersburg, in the county of Wood and State of West Virginia, have invented certain new and useful Improvements in Bicycle-Supports; and I do hereby declare that the following is a full, clear, and exact description of the same, reference being had to the annexed drawings, making a part of this specification, and to the letters of reference marked thereon.

The present invention has for its object to provide a simple and effective support for retaining a bicycle in an upright position when not in use and which is capable of easy operation to raise or lower it as circumstances require; and the invention consists in a support constructed substantially as shown in the drawings and hereinafter described and claimed.

Figure 2:
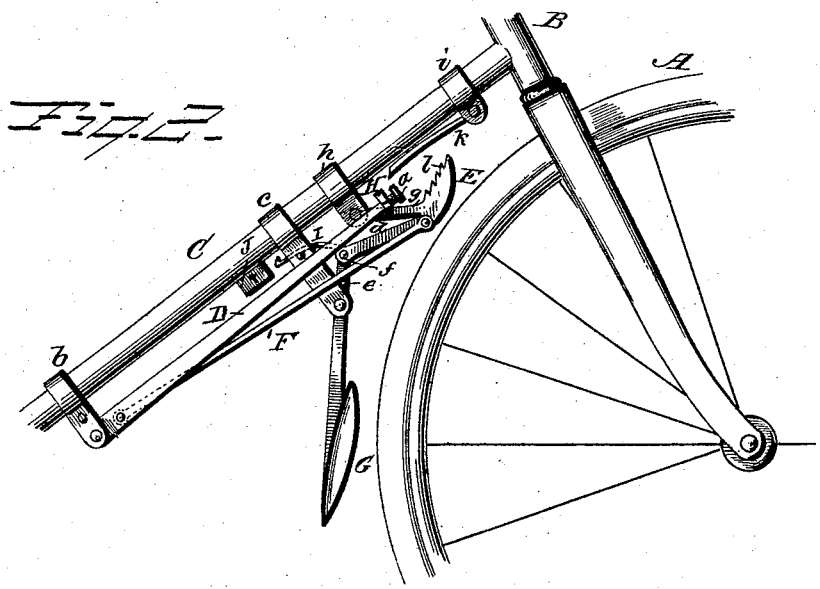

Figure 1 of the drawings represents a portion of the front wheel and frame of a bicycle with my improved support connected thereto and in position to form a support for the bicycle; Fig. 2, a similar view showing the support elevated and the position it will assume when not in use.

In the accompanying drawings, A represents the front wheel of a bicycle, and B a portion of the frame thereof, the connecting-bar C of said frame having connected thereto my improved support.

The supporting-legs D have laterally and outwardly extending feet $a$, and the upper ends of said legs are pivotally connected to a suitable coupling $b$. This coupling may be of any suitable and well-known construction and is secured in any convenient manner to the bar C of the bicycle-frame.

The supporting-legs D connect with a brake E by means of lever-rods F, which are pivoted at their respective ends to the legs and to the brake.

A second brake G is preferably employed, which brake is pivotally connected to a suitable coupling $c$ upon the bar C, the arms $d$ $e$ of the two brakes being pivotally connected together, as shown at $f$, and the arm $g$ of the brake E being pivotally connected to a suitable coupling $h$.

To a coupling $i$ is pivotally connected a suitable pawl $k$, which is adapted to engage with a ratchet $l$ upon the upper side of the brake E, and when said pawl is in an elevated position, as shown in Fig. 2 of the drawings, it is held in such position by frictional contact with the sides of the coupling or by any other suitable and well-known means found best adapted to the purpose.

The several couplings which embrace the bar of the bicycle-frame may be of any preferred construction, as may also the brakes and pawl, and any such changes as would come within ordinary mechanical construction may be resorted to without departing from the principle of my invention.

When the supporting-legs D are in an elevated position, as shown in Fig. 2 of the drawings, said legs are held in such position by a spring or other suitable holding device H, connecting with the coupling $h$, with which engages the ends of the legs.

Any suitable holding device may be substituted for that shown, so long as the ends of the supporting-legs may be engaged therewith and conveniently disengaged when it is desired to bring the legs into use for supporting the bicycle, and when this is done the various parts of the supporting mechanism are locked and prevented from being tampered with or raised to the position shown in Fig. 2 of the drawings by means of a catch I, engaging with a lock J. The catch I projects from the arm $d$ of the brake E, and the lock J is suitably connected to the bar C of the bicycle-frame.

When the supporting-legs D are brought down to the position shown in Fig. 1 of the drawings, the two brakes through their pivotal connection and the pivoted lever-rods F are brought against the tire of the bicycle-wheel and prevents the wheel from moving sidewise or laterally while the legs support the bicycle in an upright position. In this simultaneous movement of the supporting-legs and the brake or brakes the catch I is carried in the direction of the lock J and engages therewith and cannot be released except by a proper key to unlock the lock.

The pawl $k$, engaging with the ratchet $l$, holds the brake down upon the tire, which prevents the wheel from moving sidewise while the supporting-legs are in use.

In place of the two independent brakes a single brake may be used which may be of increased length to either of the brakes shown in the drawings, the brake or brakes being of material importance in bracing the wheel and holding it rigid when the supporting-legs are brought into use, the supporting-legs being of any suitable form and construction and pivotally connected with the bicycle-frame in any preferred and well-known manner.

Having now fully described my invention, what I claim as new, and desire to secure by Letters Patent, is—

1. The bicycle-frame, the supporting-legs D, pivoted to the bar C, of the frame, and the connecting-rods F, loosely attached at their rear ends to the legs, combined with the brake E, pivotally suspended from the bar C, and provided with a ratchet on its upper side, and a pawl, also suspended from the bar C, for engaging with the ratchet and holding the brake in contact with the wheel, substantially as shown.

2. The bicycle-frame, the supporting-rods D, pivotally connected to the bar C, the rods F loosely connected to the rods D at their rear ends, the brake E pivotally suspended from the bar C, the pawl K, and the ratchet on the brake with which the pawl engages, combined with the connecting-rods $d$, which connect the two brakes, the brake G, suspended from the bar C, and operated simultaneously with the brake E, by said rods $d$, and a locking mechanism connected to the rods $d$ for holding the parts in position, substantially as set forth.

In testimony that I claim the above I have hereunto subscribed my name in the presence of two witnesses.

CHARLES A. WADE.

Witnesses:
K. M. SHAW,
A. M. LUTES.